Patented Sept. 10, 1946

2,407,384

UNITED STATES PATENT OFFICE 2,407,384

SYNTHETIC FOG OR SMOKE

Alexander J. Ritchie, Bayonne, N. J., assignor to Electric Boat Company, Bayonne, N. J., a corporation of New Jersey No Drawing. Application January 1, 1943, Serial No. 471,079

5 Claims. (Cl. 252—305)

This invention relates to synthetic fog or smoke, and has for its object the provision of a new composition of matter for developing such fog or smoke. The invention is particularly applicable for the production of protective smoke screens for naval craft, land tanks and other military weapons, and is of general application wherever it is desired to produce a substantially non-corrosive and non-toxic synthetic fog or smoke.

Various compositions have heretofore been used for producing synthetic fog or smoke, but for one reason or another no entirely satisfactory composition has heretofore been available. For example, titanium tetrachloride, a liquid material, has been sprayed into the atmosphere by compressed or liquified gas, such as carbon dioxide, and when hydrolyzed by the moisture in the atmosphere produces a moderate amount of fog or smoke. More recently, a mixture of sulphur trioxide and chlorosulphonic acid has been similarly sprayed into the atmosphere and upon hydrolyzing produces a more voluminous and effective smoke than does titanium tetrachloride. However, the mixture of sulphur trioxide and chlorosulphonic acid is very corrosive, and extreme precautions are necessary to avoid its contact with wood, which it will set on fire. Because of its corrosive nature, the mixture must be kept above deck, and complicated mechanism is customarily provided for jettisoning the mixture and its container in case of a leak or other accidental rupture of the container. Moreover, the effectiveness of the mixture is considerably influenced by the atmospheric temperature, the mixture being very active in a warm atmosphere, and comparatively inert at relatively low temperature.

I have discovered that the effectiveness of titanium tetrachloride for producing synthetic fog or smoke is greatly increased by the action of phosphorus. Based on that discovery, the present invention contemplates a composition of matter for producing fog or smoke consisting principally of titanium tetrachloride and containing a relatively small amount of phosphorus. The phosphorus may advantageously be incorporated in the titanium tetrachloride by dissolving it in carbon bisulphide, and mixing the resulting solution with the liquid titanium tetrachloride. Carbon tetrachloride may be added to the phosphorus-carbon-bisulphide solution to eliminate fire hazard in the handling of the solution. Preferably, the composition is confined under pressure in a metallic container by admixing therewith a substantial amount of compressed carbon dioxide, such as liquid carbon dioxide.

The action of most chemicals in producing synthetic fog or smoke is due to hydrolysis by the moisture in the atmosphere, and hence the effectiveness of the chemical varies with the atmospheric humidity. Thus, titanium tetrachloride ($TiCl_4$) is hydrolyzed by atmospheric moisture into titanium hydrate ($Ti(OH)_4$) and hydrochloric acid ($HCl$). Hydrochloric acid is hygroscopic and forms liquid droplets by absorption of atmospheric moisture, and the minute nascent particles of titanium hydrate provide nuclei for the formation of these liquid droplets. However, the particles of titanium hydrate, even though minute, are crystalline solids and tend to plug up lines, nozzles etc. and thus make the smoke generating apparatus inoperative. One of the advantages of the mixture of sulphur dioxide and chlorosulphonic acid, over titanium tetrachloride, is that its smoke-producing particles are droplets of liquid, instead of solid crystals, which do not clog up lines, nozzles etc.

The presence of phosphorus in the composition of the invention alters the physical character of the nascent particles of titanium hydrate, so that instead of being crystalline these particles appear to be powdery or amorphous. Such amorphous particles are readily washed through the lines, nozzles etc. of the smoke generating apparatus by the on-coming fresh material, and exhibit no tendency to clog up the apparatus. The phosphorus, moreover, accelerates the initial reactions. It seems probable that the phosphorus is immediately oxidized upon coming in contact with the air, and the resultant heat of oxidation may exercise a beneficial effect in the initial stages of the smoke-producing reactions. The amount of phosphorus included in the composition is relatively small, a fraction of one percent (e. g. 0.1 to 0.2%) by weight (based on the weight of titanium tetrachloride) being sufficient. Excellent results have been obtained with 0.16% of phosphorus based on the weight of titanium tetrachloride.

The phosphorus is dissolved in several times its weight of carbon bisulphide. For example, for each part by weight of phosphorus, from 5 to 10 parts by weight of carbon bisulphide may be used. The carbon bisulphide not only serves as a solvent for the phosphorus, but is itself decomposed, either upon addition to the titanium tetrachloride or upon emission to the atmosphere, with the formation of colloidal particles of sulphur which beneficially contribute to the smoke-producing properties of the composition. In order to reduce the fire hazard in the handling of the phosphorus-carbon-bisulphide solution, I add carbon tetrachloride to the solution before mixing the solution with the titanium tetrachloride. From about ½ to 1 part (by weight) of carbon tetrachloride per part of carbon bisulphide is sufficient for the purpose.

When the phosphorus has been incorporated in the titanium tetrachloride, as hereinbefore described, the composition is charged with compressed carbon dioxide. To this end, liquid carbon dioxide is introduced into the composition, appropriately confined in a steel or other suitable container adapted to withstand the high pressure of the compressed or liquid carbon dioxide. About 5% by weight of liquid carbon dioxide, based on the weight of the titanium tetrachloride, is sufficient for the purpose. However, the amount is not critical, and more or less may be used as circumstances dictate.

In an actual practice of the invention, a composition made up as follows has been used with particular success:

| | Pounds |
|---|---|
| Titanium tetrachloride | 308 |
| Carbon bisulphide | 3 |
| Phosphorus | 0.5 |
| Liquid carbon dioxide | 16 |

Two pounds of carbon tetrachloride was mixed with the phosphorus-carbon-bisulphide solution before adding it to the titanium tetrachloride.

Since the smoke composition of the invention is not corrosive, it may be transported and stored in ordinary iron or steel containers. Due to its light weight and low cost of manufacture, a spun steel cylinder makes an excellent container for the composition. The normal operating pressure within the container is about 150 to 180 lbs. per sq. inch, and the highest pressure registered, from a charged container, on board a boat and in direct sun, has been 450 lbs. per sq. in.

In dispersing a liquid smoke composition, I have found that the unit concentration per cross section of smoke screen is very important for proper screening. A slow moving boat and a fast moving boat are the extremes. On a slow moving boat, a spray emission is slightly advantageous, while on a fast moving boat the spray is extremely detrimental. The fast moving boat requires a jet emission, because a spray makes too light an initial concentration, and quickly disappears. A jet makes a heavy concentration, which is comparatively persistent. The jet size is based upon a discharge of gas and liquid together and therefore cannot be computed by orthodox means. The orifice is necessarily large, say ¼ to $\frac{3}{16}$ inch, and this has been found advantageous since the jet, in action, is self-cleaning, and is not plugged up by the composition of the invention. The jet is preferably removable so that different sizes may be employed in warm and cold weather, e. g. summer and winter.

The total obscuring power (TOP) of the composition of the invention is substantially greater than that of any fog or smoke composition heretofore available. Moreover, it is more effective and reliable over all temperature-humidity ranges than the smoke compositions heretofore available. The fog or smoke produced by the composition of the invention may be made heavy or light. In actual practice, the smoke has been made so light that upon complete reaction it coagulated upon the surface of the water, broke loose, and rose entirely free, to float away as a cloud. The composition of the invention "breaks" immediately upon release to the atmosphere and puffs out into an effective smoke due to the expanding action of the carbon dioxide gas. The resulting smoke is very persistent.

The smoke composition of the invention "breaks" immediately on emission, with higher total obscuring power and with greater persistence than with the heretofore customary smoke compositions. The composition is non-corrosive and non-toxic, and readily available common metals may be used for the container, valves, etc. The charged containers may be safely stored below deck. The constituents of the composition are predominantly fireproofing agents, and fire-hazard is entirely absent in handling, storage, transportation and use of the composition. While the composition will stain wood, a good coat of any linseed oil (linoxin) base paint prevents staining.

I claim:

1. A composition of matter for producing synthetic fog or smoke consisting of titanium tetrachloride and containing phosphorus in an amount not over 0.2% by weight based on the weight of the titanium tetrachloride.

2. A composition of matter for producing synthetic fog or smoke comprising approximately three hundred parts by weight of titanium tetrachloride and from three to four parts by weight of a mixture made up of one part by weight of phosphorus and about six parts of carbon bisulphide.

3. A composition of matter for producing synthetic fog or smoke confined in a container under pressure created by carbon dioxide and consisting of titanium tetrachloride and a solution of phosphorus in carbon bisulphide in the proportions by weight of one part of phosphorus and from 5 to 10 parts of carbon bisulphide, the phosphorus being in an amount not exceeding 0.2% by weight based on the weight of the titanium tetrachloride, and carbon tetrachloride in an amount not to exceed one part by weight per part of carbon bisulphide.

4. A composition of matter for producing synthetic fog or smoke confined in a container under pressure created by carbon dioxide and consisting of titanium tetrachloride and a solution of phosphorus in carbon bisulphide in the proportions by weight of one part of phosphorus and from 5 to 10 parts of carbon bisulphide, the phosphorus being but a fraction of one per cent of the weight of the titanium tetrachloride.

5. A composition of matter for producing synthetic fog or smoke comprising titanium tetrachloride and a solution of phosphorus in carbon bisulphide in the proportions by weight of one part of phosphorus and not to exceed 10 parts of carbon bisulphide, the phosphorus being in an amount of from 0.1% to 0.2% by weight based on the weight of the titanium tetrachloride.

ALEXANDER J. RITCHIE.